US011875698B2

(12) United States Patent
Alves et al.

(10) Patent No.: US 11,875,698 B2
(45) Date of Patent: Jan. 16, 2024

(54) LANGUAGE LEARNING THROUGH CONTENT TRANSLATION

(71) Applicant: INTERNATIONAL BUSINESS MACHINES CORPORATION, Armonk, NY (US)

(72) Inventors: Vinicius Maidana Alves, São José do Rio Preto (BR); Thomas R. Trozzo, West Palm Beach, FL (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/804,642

(22) Filed: May 31, 2022

(65) Prior Publication Data
US 2023/0386360 A1    Nov. 30, 2023

(51) Int. Cl.
*G09B 19/06*  (2006.01)
*G09B 5/06*   (2006.01)
*G09B 5/02*   (2006.01)
*G06F 40/263* (2020.01)

(52) U.S. Cl.
CPC .......... *G09B 19/06* (2013.01); *G06F 40/263* (2020.01); *G09B 5/02* (2013.01); *G09B 5/06* (2013.01)

(58) Field of Classification Search
CPC .. G09B 19/06; G09B 5/02; G09B 5/06; G06F 40/263
See application file for complete search history.

(56) References Cited

U.S. PATENT DOCUMENTS

| 7,524,191 | B2 | 4/2009 | Marmorstein |
| 7,869,988 | B2 * | 1/2011 | Wood ..................... G09B 19/06 434/156 |
| 8,002,551 | B2 | 8/2011 | Keim |
| 8,045,135 | B2 | 10/2011 | Mulkens |

(Continued)

FOREIGN PATENT DOCUMENTS

WO    2014200223 A1    12/2014

OTHER PUBLICATIONS

Black, "Why Children Should be Watching TV with the Subtitles on", https://theconversation.com/why-children-should be-watching-tv-with - . . . , Sep. 2, 2020, pp. 1-4.

(Continued)

*Primary Examiner* — Eddy Saint-Vil
(74) *Attorney, Agent, or Firm* — Steven M. Bouknight (57) ABSTRACT

A method, a computer program product, and a computer system allow a secondary language to be learned through content translation in an engaged linguistical consumption format. The method includes determining an educational corpus for the secondary language that indicates learned words in the secondary language. The method includes determining a select portion of subtitles being shown during a play back of a multimedia file shown in a native language where the select portions include a native word corresponding to the learned words. The method includes generating a modification to the select portion such that the learned words replace the native word in the subtitles. A display of the play back of the multimedia file including the subtitles is updated with a visual graphic corresponding to the modification to replace the native word.

17 Claims, 5 Drawing Sheets

(56) References Cited

U.S. PATENT DOCUMENTS

| | | | |
|---|---|---|---|
| 8,308,484 B2 | 11/2012 | Keim | |
| 8,768,697 B2 | 7/2014 | Tepperman | |
| 8,840,400 B2 | 9/2014 | Keim | |
| 8,880,399 B2 | 11/2014 | Hagen | |
| 8,972,259 B2 | 3/2015 | Tepperman | |
| 9,135,086 B2 | 9/2015 | Fulkerson | |
| 9,424,834 B2 | 8/2016 | Simmons | |
| 9,911,349 B2 | 3/2018 | Renduchintala | |
| 9,954,938 B2 | 4/2018 | Fulkerson | |
| 10,068,569 B2 | 9/2018 | Stanley | |
| 10,210,769 B2 | 2/2019 | Simmons | |
| 10,679,616 B2 | 6/2020 | Stanley | |
| 10,812,575 B2 | 10/2020 | Fulkerson | |
| 2006/0019223 A1* | 1/2006 | Wood | G09B 19/00 434/156 |
| 2009/0162818 A1 | 6/2009 | Kosakowski | |
| 2010/0323333 A1* | 12/2010 | Yoo | G09B 19/06 434/157 |
| 2011/0191104 A1 | 8/2011 | Tepperman | |
| 2011/0311952 A1 | 12/2011 | Fairfield | |
| 2012/0065977 A1 | 3/2012 | Tepperman | |
| 2014/0170610 A1 | 6/2014 | Ridgeway | |
| 2014/0170629 A1 | 6/2014 | Keim | |
| 2014/0205974 A1 | 7/2014 | Pellom | |
| 2016/0072879 A1 | 3/2016 | Fulkerson | |
| 2017/0116870 A1 | 4/2017 | Brem | |
| 2017/0140661 A1 | 5/2017 | Simmons | |
| 2017/0186338 A1 | 6/2017 | Treves | |
| 2021/0014575 A1 | 1/2021 | Selfors | |

OTHER PUBLICATIONS

IBM, "Get Started with Natural Language Processing", accessed Mar. 28, 2022, pp. 1-5.

IBM, "Live Closed Captions", http://supoort.video.ibm.com/hc/en-us/articles/207851907-Live-Closed . . . , accessed Mar. 28, 2022, pp. 1-10.

Mell et al., "The NIST Definition of Cloud Computing", National Institute of Standards and Technology, Special Publication 800-145, Sep. 2011, pp. 1-7.

Rosetta, "The Experts in Language Learning", https://www.rosettastone.com/, accessed Mar. 28, 2022, pp. 1-6.

* cited by examiner

LANGUAGE LEARNING THROUGH CONTENT TRANSLATION

BACKGROUND

The exemplary embodiments relate generally to learning languages, and more particularly to dynamically modifying a subtitle track of a multimedia file based on a user proficiency in a language to be learned.

A user may learn a new language through a variety of different offerings or self-study. For example, the user may enroll with a teaching institution where the new language is taught in a traditional classroom setting, in-person or virtual. In another example, the user may purchase a textbook or application that provides a curriculum to learn the new language. These traditional standalone education formats require the user to dedicate time and resources to learn this new language. These traditional standalone education formats also follow the curriculum in a biased manner over the requirements or intentions of the user.

SUMMARY

The exemplary embodiments disclose a method, a computer program product, and a computer system for allowing a secondary language to be learned through content translation in an engaged linguistical consumption format. The method comprises determining an educational corpus for the secondary language. The educational corpus is indicative of a plurality of learned words in the secondary language. The method comprises determining a select portion of subtitles being shown during a play back of a multimedia file. The subtitles are in a native language and the select portions include a native word corresponding to one of the learned words. The method comprises generating a modification to the select portion of the subtitles such that the one of the learned words replaces the native word when the select portion of the subtitles is shown during the play back of the multimedia file. A display of the play back of the multimedia file including the subtitles is updated with a visual graphic corresponding to the modification to replace the native word.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for allowing a secondary language to be learned through content translation in an engaged linguistical consumption format. The exemplary embodiments provide a mechanism that teaches a user in a new language through a total immersion into the new language. As will be described in further detail below, the exemplary embodiments provide an approach in which the immersion is incorporated into a consumption of content such as entertainment or other multimedia content. Accordingly, when the content is consumed, the exemplary embodiments introduce a dynamic and unique mechanism to append and manipulate teachings of the new language. Specifically, the exemplary embodiments may dynamically replace selected native words in a subtitle track with words from the new language according to the user's progress in learning the new language. Key benefits of the exemplary embodiments may include accelerating language learning with consumption of multimedia content based on a user's learning level and goals in a seamless manner without requiring standalone learning sessions. Detailed implementation of the exemplary embodiments follows.

Conventional approaches have provided a variety of mechanisms to allow a user to learn a new language beyond the traditional standalone learning formats such as a classroom. For example, a conventional approach may simply display multiple subtitle tracks in different languages concurrently. In another example, a conventional approach provides audio assistance to translated subtitles. In a further example, a conventional approach replaces subtitles according to a predesigned curriculum. However, these conventional approaches do not provide any mechanism to dynamically modify a generation of subtitles based on a user progress with regard to a learning plan according to a current user proficiency of the language, a dynamic replacement of selected words based on the user progress, and dynamic determination of cultural context to provide appropriate subtitles.

The exemplary embodiments are configured to allow a user to learn a new language in an enhanced manner through selective and dynamic modification of subtitles in content being consumed by the user. The exemplary embodiments provide a method of adaptively changing subtitles from a familiar language to the new language based on user proficiency and target learning goals such as recently learned words that are unique to the user. As will be described in further detail below, the user may be watching television with subtitles activated such that a word in the new language that has been learned may dynamically replace a native word in the familiar language where this process may evolve over time with immersion. Through the exemplary embodiments, the user may be empowered by enhanced reading and listening comprehension by changing or showing any particular weakness in the new language and dynamically transforming the subtitles shown with the content. In this manner, the exemplary embodiments incorporate features of an education plan visibility, aspects of IOT, a lowest common denominator feature when multiple users are presented the content concurrently, and smart device interaction.

The exemplary embodiments are described with regard to learning a new language through multimedia content, namely a subtitle track associated with a multimedia file. However, the user of the new language and the multimedia content is only illustrative. The exemplary embodiments may be utilized and/or modified to allow a user to learn any new information in an immersive experience by consuming any form of content.

In describing the exemplary embodiments, the user may have a native language or any language in which the user is fluent. Such languages will be referred to herein collectively as a "native language." Furthermore, the user may be learning a new language or a language in which the user is not fluent. Such languages will be referred to herein collectively as a "secondary language."

Figure 1:
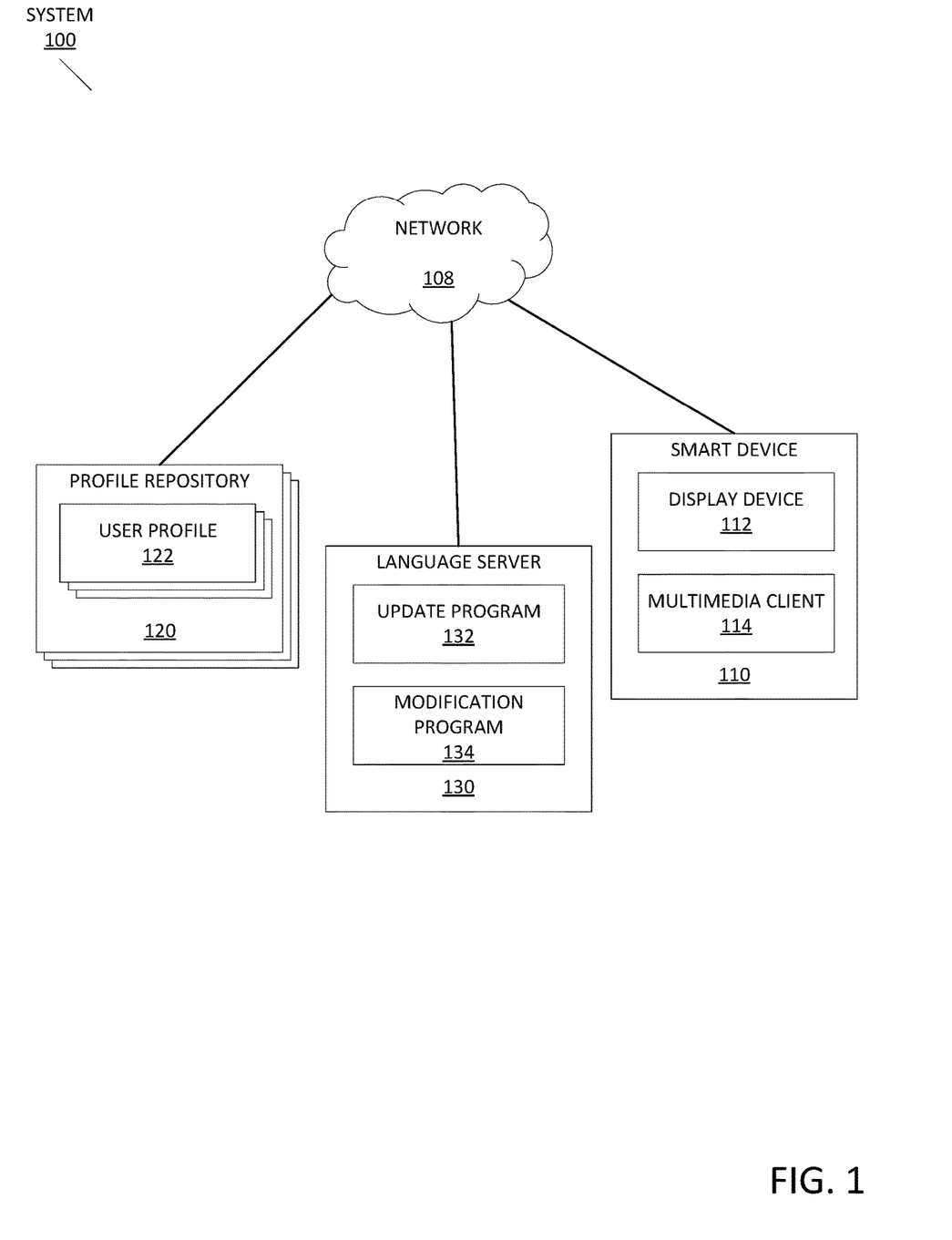
FIG. 1 depicts an exemplary schematic diagram of a language learning system 100, in accordance with the exemplary embodiments.

FIG. 1 depicts a language learning system 100, in accordance with the exemplary embodiments. According to the exemplary embodiments, the language learning system 100 may include a smart device 110, one or more profile repositories 120, and a language server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the language learning system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the language learning system 100 that do not utilize the network 108.

In the exemplary embodiments, the smart device 110 may include a display device 112 and a multimedia client 114, and may be a smart television, an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the laptop computer 54C), and/or as utilizing functional abstraction layers for processing with reference to FIG. 5 (e.g., workload layer 90 including language modification processing 96 according to the exemplary embodiments).

In the exemplary embodiments, the display device 112 may be any device configured to show multimedia content to a user associated with the user device 110. For example, the multimedia content may be a multimedia file that is rendered into an appropriate visual format to be shown on the display device 112. The multimedia file may be received from a further device (e.g., a multimedia playing device such as a DVD player, other disc players, etc.), may be received via a streaming service via the network 108, etc. The display device 112 may also be configured to show a subtitle track associated with the multimedia file. The subtitle track may be a pre-programmed set of text corresponding to spoken words in the multimedia file, descriptive phrases of audio-related sounds in the multimedia file, closed captioning, etc. Accordingly, in activating the subtitle track, the display device 112 may show the corresponding subtitles based on a timestamp of the multimedia file.

In the exemplary embodiments, the multimedia client 114 may act as a client in a client-server relationship and may be a software, hardware, and/or firmware based application capable of receiving modifications to the subtitle track via the network 108. In embodiments, the multimedia client 114 may provide a background operation in which the modifications are dynamically applied to the subtitles being shown on the display device 112 as well as interact with one or more components of the language learning system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The multimedia client 114 may be configured to provide a plurality of functionalities. For example, the multimedia client 114 may incorporate various technologies to show the multimedia file and render corresponding audio and/or visual data of the multimedia file on the display device 112 and any accompanying audio output device. In another example, the multimedia client 114 may show a subtitle track of the multimedia file. As described above, the subtitle track may be a set of subtitles that are shown at predetermined timestamps based on a progress of the audio/visual content of the multimedia file. The multimedia client 114 may be configured to receive inputs from the user to select the subtitle track such as a language of the subtitle track. The inputs may also include display features (e.g., a font size, a font type, etc.). In a further example, the multimedia client 114 may be configured to process the audio and/or visual information of the multimedia file being played back to determine various language parameters. For example, the language parameters may include a current language being spoken, close captions, subtitles, etc. and may determine these language parameters by listening to a corresponding output feed of the multimedia file. With further sources for multimedia files and compatibility issues, the multimedia client 114 may not have immediate access to such language parameters. As such, the multimedia client 114 may be configured with this functionality. The multimedia client 114 may utilize various techniques such as speech recognition techniques, voice-to-text techniques, etc.

According to the exemplary embodiments, the multimedia client 114 may be configured to provide further functionalities. For example, the multimedia client 114 may provide a user interface in which the user may select the secondary language (i.e., a language that the user wishes to learn). However, it is noted that the manual entry of the secondary language is one manner in which the secondary language may be selected. The exemplary embodiments may be configured to perform background operations (e.g., relative to the user) to access available information in which the secondary language is determined and selected such as through a user profile which is described in further detail below. The user may also indicate a learning goal with respect to the secondary language. The learning goal may indicate a desired proficiency to be reached by an indicated time. For example, the user indicates wishing to reach a specific proficiency level (e.g., level 5 out of 10 possible levels where 1 is beginner and 10 is fluency) within a time duration from onset (e.g., 6 months). In another example, as will be described in greater detail below, the multimedia client 114 may be configured to receive modifications as instructions from the server 130 to be selectively and dynamically applied to the subtitles being shown on the display device 112.

In the exemplary embodiments, the profile repository 120 may include one or more user profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the language learning system 100. For example, the profile repository 120 may be incorporated in the language server 130. Thus, access to the profile repository 120 by the language server 130 may be performed locally. In another example, the user profiles 122 represented in the profile repository 120 may be incorporated in respective ones of the smart devices 110 (e.g., the smart device 110 has a profile repository 120 including at least the user profile 122 of the user who is associated therewith). Thus, access to the profile repository 120 and to a specific one of the user profiles 122 may be performed through a transmission from the smart device 110. The profile repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the user profiles 122 may each be associated with a respective user and may be populated with various types of information that may be used for subsequent operations used in allowing a user to learn the secondary language. In an exemplary embodiment, the user profiles 122 may each be associated with a user identification to uniquely identify the user. The multimedia client 114 may also be associated with the user identification such that using the multimedia client 114 may identify the user identification and the information contained in the corresponding user profile 122. In another exemplary embodiment, each of the user profiles 122 may include language information of the user such as an educational corpus. For example, the user profile 122 may indicate one or more native languages (i.e., languages that the user is proficient and is not requesting further learning) and one or more secondary languages. In another example, for the secondary languages, the user profile 122 may indicate a respective user proficiency where the user proficiency may include a general proficiency level (e.g., beginner, near fluent, or any level therebetween) as well as a detailed proficiency level (e.g., words that have been learned, words that have been taught, grammar rules learned and/or taught, conjugation rules learned and/or taught, etc.). The detailed proficiency level may also include timestamps of when a particular aspect of the secondary language was learned or taught (e.g., a parameter that may be used for review purposes after a predetermined time). The educational corpus may also include learning goals of the user for the secondary language. The educational corpus may further be tied to an actual educational system or standalone education format.

In the exemplary embodiments, the language server 130 may include an update program 132 and a modification program 134, and act as a server in a client-server relationship with the multimedia client 114 as well as be in a communicative relationship with the profile repository 120. The language server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the language server 130 is shown as a single device, in other embodiments, the language server 130 may be comprised of a cluster or plurality of computing devices, working together or working independently. While the language server 130 is also shown as a separate component, in other embodiments, the operations and features of the language server 130 may be incorporated with one or more of the other components of the language learning system 100. For example, the operations and features of the language server 130 may be incorporated in the smart device 110. The language server 130 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including language modification processing 96 according to the exemplary embodiments).

In the exemplary embodiments, the update program 132 may be a software, hardware, and/or firmware application configured to update the user profiles 122. Prior to using the features of the exemplary embodiments in which modifications to subtitles are dynamically and selectively performed, the update program 132 may update the user profile 122 of the user associated with the multimedia client 114 who has selected to utilize the exemplary embodiments based on update information. The update program 132 may access a variety of different sources to access the update information to update the user profiles 122. For example, the user may manually provide update information to the user proficiency in the secondary language portion of the user's user profile 122 especially for information that is not electronically available (e.g., updates from recent standalone lessons, personal study to learn more words, etc.). In another example, the user profile 122 may include network sources (e.g., a website, an online course, etc.) that the user has enrolled or utilizes to learn the secondary language such that the update program 132 may query these network sources (e.g., at predetermined intervals, continuously, at various events such as use of the exemplary embodiments, etc.) to receive the update information. In a further example, the update program 132 may track use of the modifications provided by the exemplary embodiments that form the basis of the update information. In this manner, the update program 132 may maintain the user profiles 122 with a most current state of the user proficiency in the secondary language.

In the exemplary embodiments, the modification program 134 may be a software, hardware, and/or firmware application configured to utilize the information in the user profile 122 with regard to user proficiency and learning goals to dynamically and selectively modify subtitles being shown for a multimedia file on the display device 112. The modification program 134 may receive a subtitle track associated with a multimedia file being played back on the display device 112 of the user device 110. Based on the user proficiency in the secondary language and the learning goals, the modification program 134 may determine native words in the subtitle track in a native language that may be replaced with corresponding words in the secondary language. The modification program 134 may replace words, for example, that have been learned or taught to the user at a time prior to the modification of the subtitles. In a particular implementation, to reinforce learning a particular word, the modification program 134 may replace specific words that have been recently learned (e.g., within a past week, within a past month, etc.). In another implementation, to review words that were taught during a time outside a recent timeframe, the modification program 134 may replace specific words that were learned at a relatively longer time prior to a current time. In a further implementation, the modification program 134 may select words that the user has shown difficulty or has struggled with learning. It is noted that the use of words in the above description is representative of any aspect of the secondary language such as phrases, grammar, concepts, themes of words, etc.

In a particular embodiment, as a result of listening to the output feed of the multimedia file and determining a current language being spoken, the modification program 134 may determine whether the current language being spoken corresponds to the secondary language for the user. In determining that the current language is the secondary language, the modification program 134 may perform subsequent operations.

The modification program 134 may be configured to generate instructions provided to the multimedia client 114 to execute the modifications of the subtitles being shown on the display device 112. According to an exemplary implementation, with the modifications being directed to a specific user and that user's user proficiency and learning goals, the modification program 134 may generate instructions such that the multimedia client 114 selectively and dynamically modifies the subtitles being shown. For example, the subtitles may be shown in a conventional manner with the subtitle track being read and shown at predetermined timestamps for predetermined durations. Based on the instructions for the modifications, the multimedia client 114 may replace the select words in the subtitles such that the corresponding words in the secondary language are instead shown. In this manner, the view on the display device 112 may be updated so that the words are replaced in a relatively seamless manner (e.g., match with corresponding font type and font size). The multimedia client 114 may perform the replacement in a variety of manners. For example, the multimedia client 114 may generate a visual graphic including the selected word to be shown in the secondary language and position the visual over the word in the native language that is to be replaced. In another example, the multimedia client 114 may replace the text to be shown in the subtitle track in a preliminary operation. The multimedia client 114 may also utilize various visual features such as a complete replacement or a dynamic replacement (e.g., fading out the word in the native language out while fading in the word in the secondary language).

The modification program 134 and the multimedia client 114 may also utilize location services to determine the user for which the modifications are to be made based on the determined user's user proficiency and learning goals. For example, the multimedia client 114 may utilize a range determination mechanism to determine user devices that are within range of the smart device 110. The user devices may have user identifications associated therewith such that the modification program 134 may identify the corresponding user profiles 122. The range determination mechanism may set a threshold range to determine one or more users who are likely consuming the content being shown on the display device 112 (e.g., users who are present in a room to watch the multimedia file).

As a result of being properly configured, the modification program 134 and the multimedia client 114 may provide modifications by remitting a direct form of content that is available. For example, the modification program 134 may determine a use of a video stream or a context stream that replaces the subtitles in a selective and dynamic manner.

The modification program 134 and the multimedia client 114 may also be configured to determine and provide the modifications in various scenarios. For example, in a manner consistent with the above description, the user may be viewing a multimedia file in the native language with subtitles also in the native language. The exemplary embodiments may selectively and dynamically replace words in the native language to words in the secondary language. Accordingly, the exemplary embodiments may dynamically change subtitles that are generated for a content's native language based on a user proficiency and learning goals of the secondary language. In another example, the user may be viewing a multimedia file in the secondary language with subtitles in the native language. The exemplary embodiments may again selectively and dynamically replace words in the native language to words in the secondary language as may be spoken in the multimedia file. Accordingly, the exemplary embodiments may dynamically change subtitles that are generated for a content's language that is non-native to the user based on a user proficiency and learning goals of the secondary language. In a further example, the user may be viewing a multimedia file in the secondary language where a context is also based on a culture associated with the secondary language. In such scenarios, there may be abstract concepts specific to the culture, idioms only understood by the culture, etc. In these scenarios, the subtitles may also not be activated. However, through listening to the audio output of the multimedia file, the exemplary embodiments may provide subtitles for such culture specific statements whereas concrete statements with no cultural context have no subtitles accompanying the play back.

The modification program 134 and the multimedia client 114 may also be configured to determine and provide the modifications in various scenarios involving an audience. For example, the exemplary embodiments may be implemented for a single use case by the user. The single use case may correspond to the above scenarios in which the multimedia file is played back in the user's native or non-native language with subtitles being shown in the native language. As such, the user proficiency and learning goals of the user may form the basis upon which modifications to the subtitles are determined. In another example, the exemplary embodiments may be implemented for a plural use case by multiple users consuming the content of the multimedia file. As noted above, the exemplary embodiments may be configured to determine one or more user devices in a proximity to the smart device 110 to determine corresponding one or more users who are consuming the content of the multimedia file being played back. As a result of multiple users, the exemplary embodiments may manage a group of users and approach a learning situation within multiple manners. In an exemplary implementation, the exemplary embodiments may utilize a lowest common denominator approach. The exemplary embodiments may reference multiple educational corpuses of the determined users for knowledge being referenced, based on a user's singular normal usage of the exemplary embodiments when alone. The exemplary embodiments may aggregate into a hybrid or shared knowledge corpus on demand as a hybrid approach by referencing a lowest common denominator within the scope of content. In this manner, the exemplary embodiments may provide a learning experience where all users may participate.

As noted above, the implementation shown in FIG. 1 where the user device 110 coordinates with the language server 130 over the network 108 is only for illustrative purposes and other configurations may be utilized. In another implementation of the exemplary embodiments, the language learning system 100 may be embodied within the user device 110. For example, the functionalities of the language server 130 may be incorporated in the user device 110. The data repository 120 may also be incorporated in the user device 110. In this manner, whether or not a network connection is available, the user may utilize the features of the exemplary embodiments while the multimedia client 114 is being used during a time a multimedia file is playing back with the subtitles activated.

Figure 2:
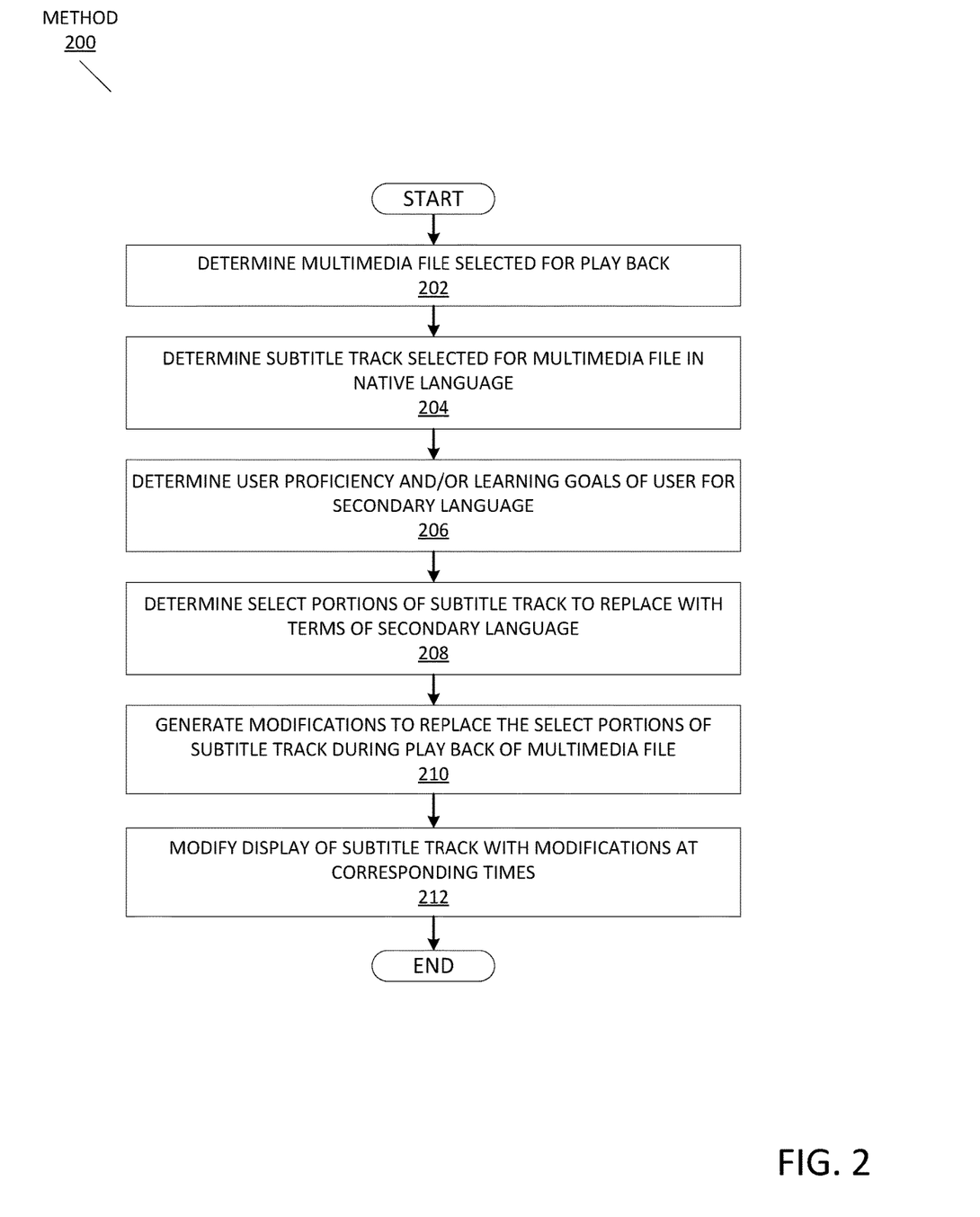
FIG. 2 depicts an exemplary flowchart of a method illustrating the operations of a language server 130 of the language learning system 100 in allowing a secondary language to be learned through content translation in an engaged linguistical consumption format, in accordance with the exemplary embodiments.

FIG. 2 depicts an exemplary flowchart of a method 200 illustrating the operations of the language server 130 of the language learning system 100 in determining, based on reactions exhibited by a user while consuming information, options for further information, in accordance with the exemplary embodiments. The method 200 may relate to operations that are performed by the update program 132, the modification program 134, the search program 136, and the selection program 138 to determine the options for the further information. The method 200 will be described from the perspective of the language server 130.

The method 200 is also described with regard to a single use case where a user is consuming the content of the multimedia content shown on the display device 112 of the smart device 110. The method 200 is further directed to a scenario where the subtitles of a given subtitle track are presented in a native language for the user where the audio may be in the native language or the secondary language. As such, the scenario is related to using modifications where select terms or words in the subtitles shown in the native language are replaced with corresponding terms or words in the secondary language.

The method 200 may also incorporate the user opting into using the features of the exemplary embodiments. For example, through installation of the multimedia client 114, registration with the language server 130, etc., the user may directly or indirectly opt for using the exemplary embodiments. In this regard, the user may install any necessary software, update or install any firmware, and/or utilize any appropriate hardware on a media consumption platform.

The language server 130 may determine a multimedia file selected for play back (step 202). The multimedia client 114 may provide information to the language server 130 indicating the multimedia file that has been selected to be played back on the display device 110. The multimedia client 114 may also monitor or listen to the outputs of the multimedia file including video, audio, subtitles, closed captions, etc.

The language server 130 may determine a subtitle track selected for the multimedia file in a native language (step 204). The multimedia client 114 may provide a selection of the subtitle track or listen for the output related to the subtitles. Specifically, the multimedia client 114 may determine the language selected for the audio aspect of the multimedia file as well as the language selected for the subtitles during the play back of the multimedia file.

The language server 130 may determine a user proficiency and learning goals of the user for a secondary language (step 206). The language server 130 may access the user profile 122 of the user to retrieve the user's educational corpus that may indicate a user proficiency and learning goals. The educational corpus may be captured such as from an educational platform or a self set user experience goal. The educational corpus may also be captured for known or spoken words to determine a fluency or keywords to route to a given corpus based on a user's speech, usage, and accuracy. The educational corpus may additionally be tied to an actual or standalone educational system to which the user participates. In accessing the educational corpus, the language server 130 may determine whether the language of the subtitles or the audio may be used as a basis to provide the modifications.

The language server 130 may determine select portions of the subtitles in the subtitle track to replace with corresponding terms of the secondary language (step 208). The language server 130 may determine, based on the user proficiency and/or the learning goals, the types of modifications that may be provided to the user via the subtitles. For example, the learning server 130 may determine words, phrases, grammar, concepts, themes of words, etc. for which modifications may be provided. In a particular implementation, the learning server 130 may also be configured to remit a direct form of content that is available such as a video stream, a context stream, etc. The language server 130 may also select the portions based on the secondary language for words that may be interchangeable. For example, the language server 130 may execute a reverse lookup to see a user's fluency and words that may be known by the user to identify words, phrases, grammar, concepts, themes, etc. that may be modified during presentation of the subtitles.

The language server 130 may generate modifications to replace the select portions of the subtitles in the subtitle track during the play back of the multimedia file (step 210). As a result of determining the manner in which to allow learning of the secondary language by the user based on the educational corpus, the language server 130 may generate the appropriate modifications to be used. For example, specific words in a native language may be manipulated by switching the language to the secondary language. In this manner, the language server 130 may modify the display on the display device 112 of the subtitles with the modifications at corresponding times (step 212). Specifically, the language server 130 may provide instructions to the smart device 110 and the multimedia client 114 to effectuate the display of the modifications. For example, the subtitles being output based on the subtitle track, the word may be identified and replaced with a graphic of the word in the secondary language.

As described above, the method 200 may incorporate various operations to incorporate further features. For example, the method 200 may include an operation to determine an identity of the user. The user may be identified in various ways such as through identification of the smart device 110, a user device in proximity to the smart device 110, a user login via the multimedia client 114, other forms of metadata that may uniquely identify the user, etc. In another example, the method 200 may include an operation to determine whether the scenario calls for a single use case or a multiple use case where a plurality of users is concurrently consuming the content of the multimedia file. As described above, a range or proximity detection of user devices to the smart device 110 may be used to determine a presence of the users who are likely to consume the content of the multimedia content.

In another example, the method 200 may include an operation to determine whether the content of the multimedia file being shown on the display device 112 relates to abstract content where a subtitle modification may be appropriate. In this particular implementation, the language server 130 may process the content of the multimedia file being played back to determine if the context is abstract or concrete. As a result of the context being concrete, the language server 130 may selectively utilize these portions of the subtitles because concrete examples provide improved reception for educational content and may be easily found using object recognition on specific key words.

In a further example, the method 200 may include an update operation so that the user profile 122 remains current with regard to the user proficiency and the learning goals. With each iteration of using the features of the exemplary embodiments while consuming content in multimedia files, the language server 130 may track a progress of the user so that subsequent iterations may further the learning of the user for the secondary language. Accordingly, the language server 130 may determine whether meaningful progress is being made based on the changes or if concepts need to be reintroduced.

To further illustrate the operations of the language server 130, reference is now made to an illustrative exemplary embodiment. According to the illustrative exemplary embodiment, a user whose native language is English may be watching television and trying to learn Spanish. As the user's comprehension of Spanish increases, the learning server 130 may update the background database or the user profile 122 associated with the user with respect to known and recognized words within the Spanish language. The language server 130 may continually learn and track the user's understanding of both the native and secondary languages. As the user is learning new words in the secondary language, the learning server 130 may evolve the translation of the content in the subtitles once the user has learned the offered modifications in the secondary language. Thus, over time, the user may be continuing a growth of content consumption of the secondary language.

Figure 3:
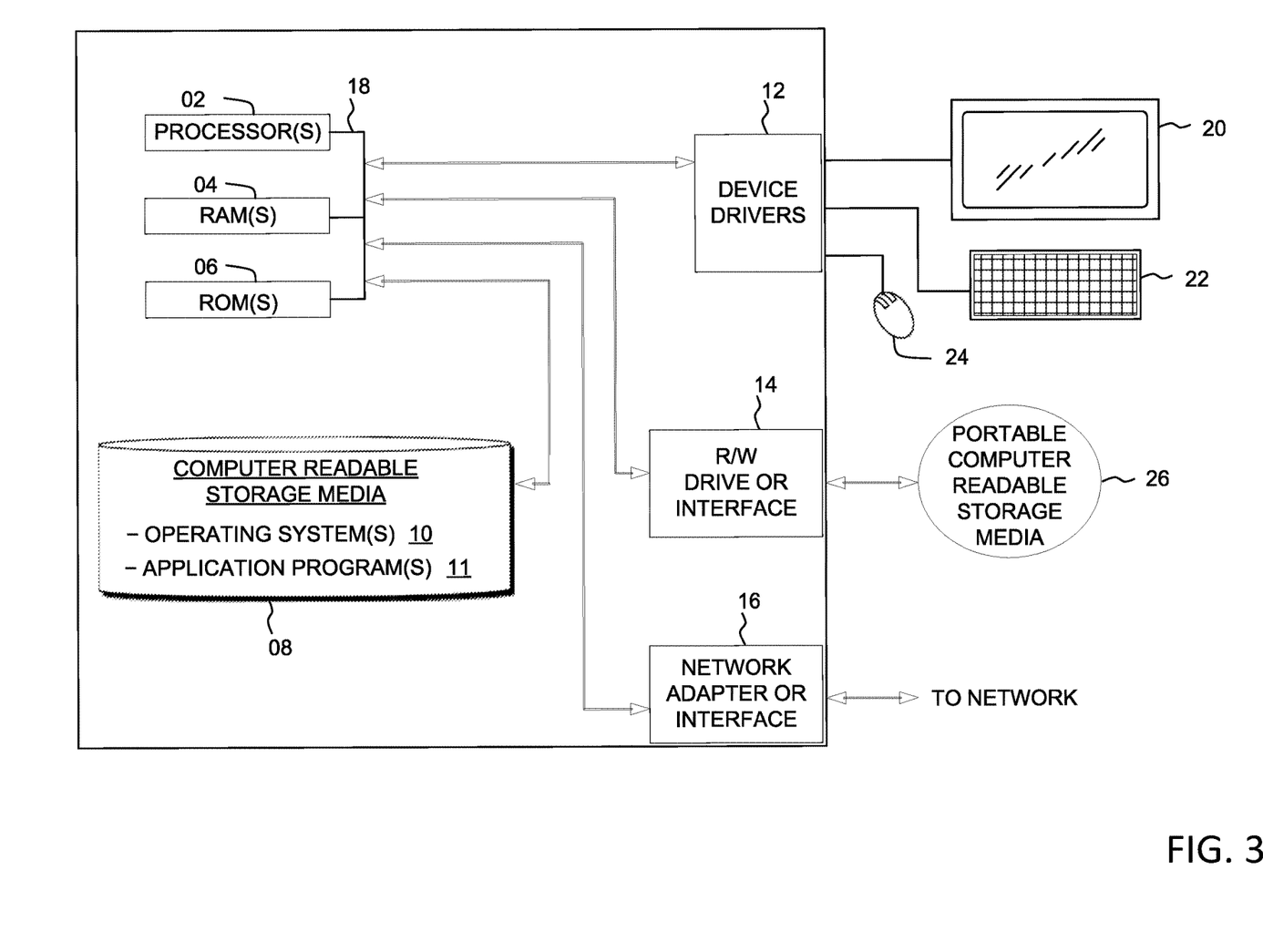
FIG. 3 depicts an exemplary block diagram depicting the hardware components of the language learning system 100 of FIG. 1, in accordance with the exemplary embodiments.

FIG. 3 depicts a block diagram of devices within the language learning system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
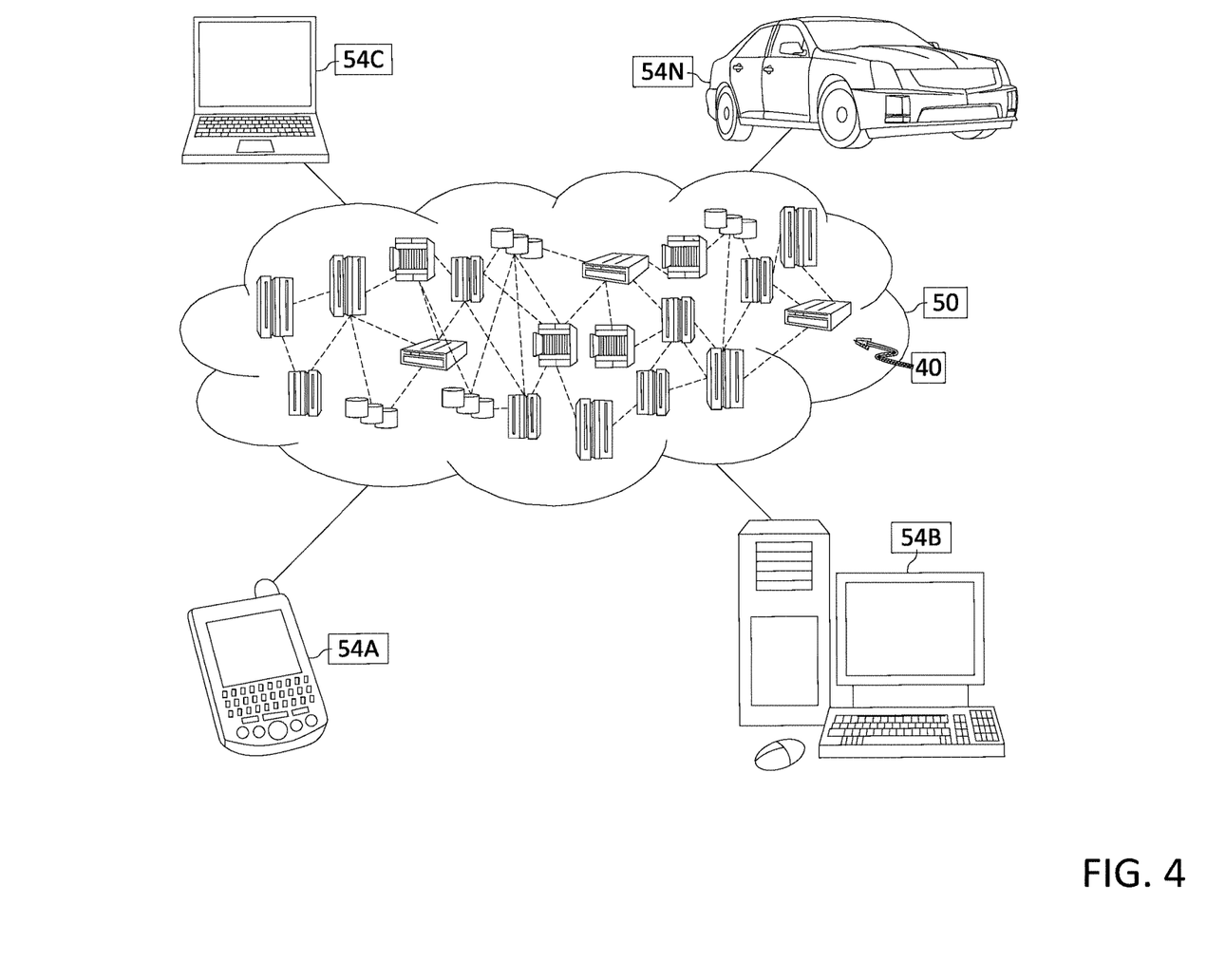
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
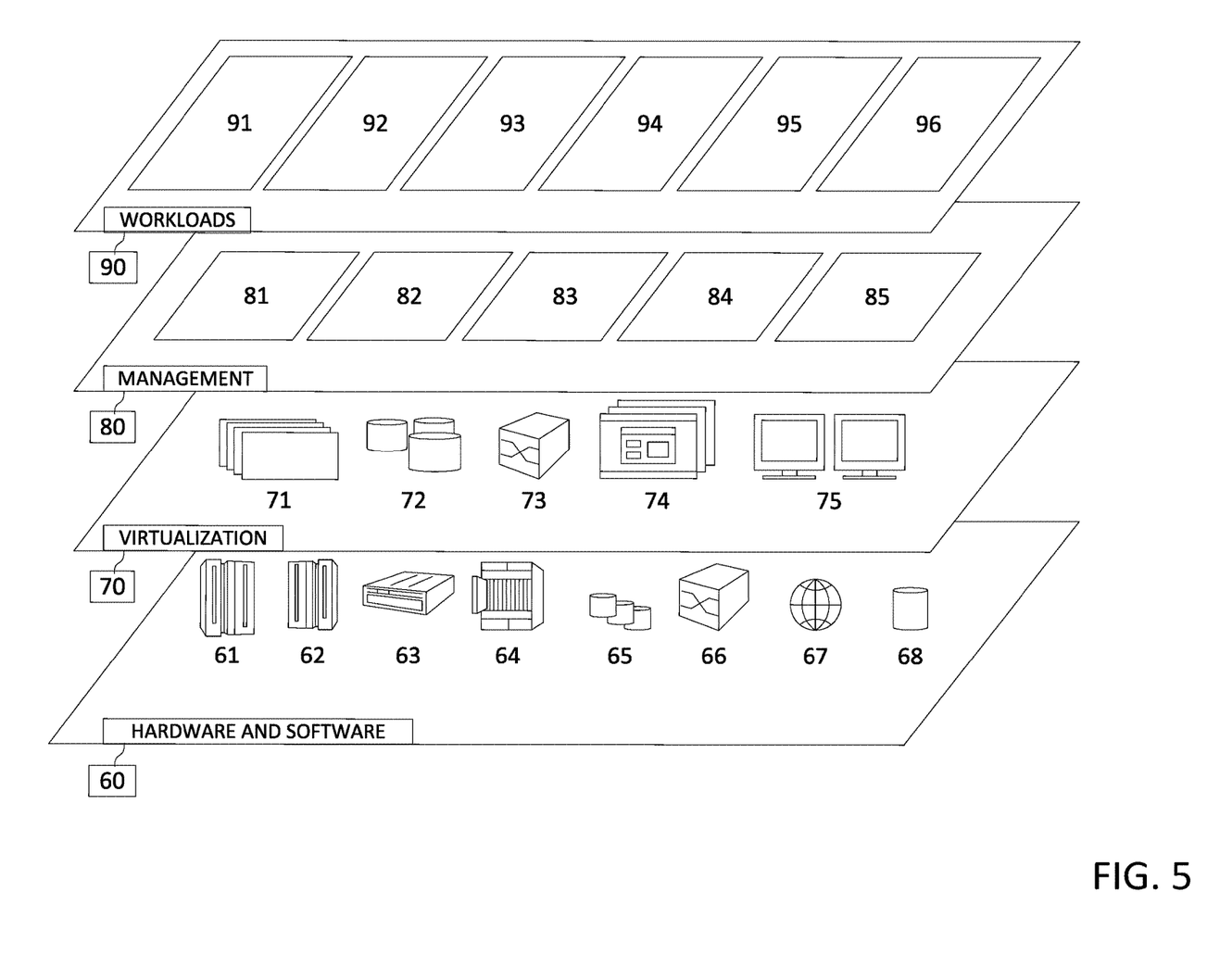
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and language modification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for allowing a secondary language to be learned through content translation in an engaged linguistical consumption format, the method comprising:
   determining an educational corpus for the secondary language, the educational corpus indicative of a plurality of learned words in the secondary language;
   determining a select portion of subtitles being shown during a play back of a multimedia file, the subtitles being in a native language, the select portions including a native word corresponding to one of the learned words;
   based on a context associated with the select portion, determining whether the select portion includes at least one of abstract content and concrete content; and
   generating a modification to the select portion of the subtitles based on the context and the determination of abstract content and concrete content such that the one of the learned words replaces the native word when the select portion of the subtitles is shown during the play back of the multimedia file,
   wherein a display of the play back of the multimedia file including the subtitles is updated with a visual graphic corresponding to the modification to replace the native word.

2. The computer-implemented method of claim 1, wherein the educational corpus indicates a user proficiency and learning goals of the secondary language, wherein the modification is based on at least one of the user proficiency and the learning goals.

3. The computer-implemented method of claim 1, further comprising:
   determining that the subtitles are in the native language by processing an output of the multimedia file.

4. The computer-implemented method of claim 1, wherein the play back of the multimedia file includes an audio output in the native language.

5. The computer-implemented method of claim 1, wherein the play back of the multimedia file includes an audio output in the secondary language.

6. The computer-implemented method of claim 1, wherein the learned word is learned within a predetermined time relative to a current time.

7. A computer-readable storage media that configures a computer to perform program instructions stored on the computer-readable storage media for allowing a secondary language to be learned through content translation in an engaged linguistical consumption format, the program instructions comprising:

determining an educational corpus for the secondary language, the educational corpus indicative of a plurality of learned words in the secondary language;

determining a select portion of subtitles being shown during a play back of a multimedia file, the subtitles being in a native language, the select portions including a native word corresponding to one of the learned words;

based on a context associated with the select portion, determining whether the select portion includes at least one of abstract content and concrete content; and generating a modification to the select portion of the subtitles based on the context and the determination of abstract content and concrete content such that the one of the learned words replaces the native word when the select portion of the subtitles is shown during the play back of the multimedia file, wherein a display of the play back of the multimedia file including the subtitles is updated with a visual graphic corresponding to the modification to replace the native word.

8. The computer-readable storage media of claim 7, wherein the educational corpus indicates a user proficiency and learning goals of the secondary language, wherein the modification is based on at least one of the user proficiency and the learning goals.

9. The computer-readable storage media of claim 7, wherein the program instructions further comprise:
determining that the subtitles are in the native language by processing an output of the multimedia file.

10. The computer-readable storage media of claim 7, wherein the play back of the multimedia file includes an audio output in the native language.

11. The computer-readable storage media of claim 7, wherein the play back of the multimedia file includes an audio output in the secondary language.

12. The computer-readable storage media of claim 7, wherein the learned word is learned within a predetermined time relative to a current time.

13. A computer system for allowing a secondary language to be learned through content translation in an engaged linguistical consumption format, the computer system comprising:

one or more computer processors, one or more computer-readable storage media, and program instructions stored on the one or more of the computer-readable storage media for execution by at least one of the one or more processors capable of performing a method, the method comprising:

determining an educational corpus for the secondary language, the educational corpus indicative of a plurality of learned words in the secondary language;

determining a select portion of subtitles being shown during a play back of a multimedia file, the subtitles being in a native language, the select portions including a native word corresponding to one of the learned words;

based on a context associated with the select portion, determining whether the select portion includes at least one of abstract content and concrete content; and generating a modification to the select portion of the subtitles based on the context and the determination of abstract content and concrete content such that the one of the learned words replaces the native word when the select portion of the subtitles is shown during the play back of the multimedia file, wherein a display of the play back of the multimedia file including the subtitles is updated with a visual graphic corresponding to the modification to replace the native word.

14. The computer system of claim 13, wherein the educational corpus indicates a user proficiency and learning goals of the secondary language, wherein the modification is based on at least one of the user proficiency and the learning goals.

15. The computer system of claim 13, wherein the method further comprises:
determining that the subtitles are in the native language by processing an output of the multimedia file.

16. The computer system of claim 13, wherein the play back of the multimedia file includes an audio output in the native language.

17. The computer system of claim 13, wherein the play back of the multimedia file includes an audio output in the secondary language.

* * * * *